May 17, 1938.    D. HENDERSON    2,117,886
MECHANICAL MOVEMENT FOR MOTOR COASTERS
Filed Oct. 6, 1936    2 Sheets-Sheet 1

INVENTOR
*D. Henderson*
BY *G. Ward Kemp*
ATTORNEY

May 17, 1938.　　　D. HENDERSON　　　2,117,886
MECHANICAL MOVEMENT FOR MOTOR COASTERS
Filed Oct. 6, 1936　　　2 Sheets-Sheet 2
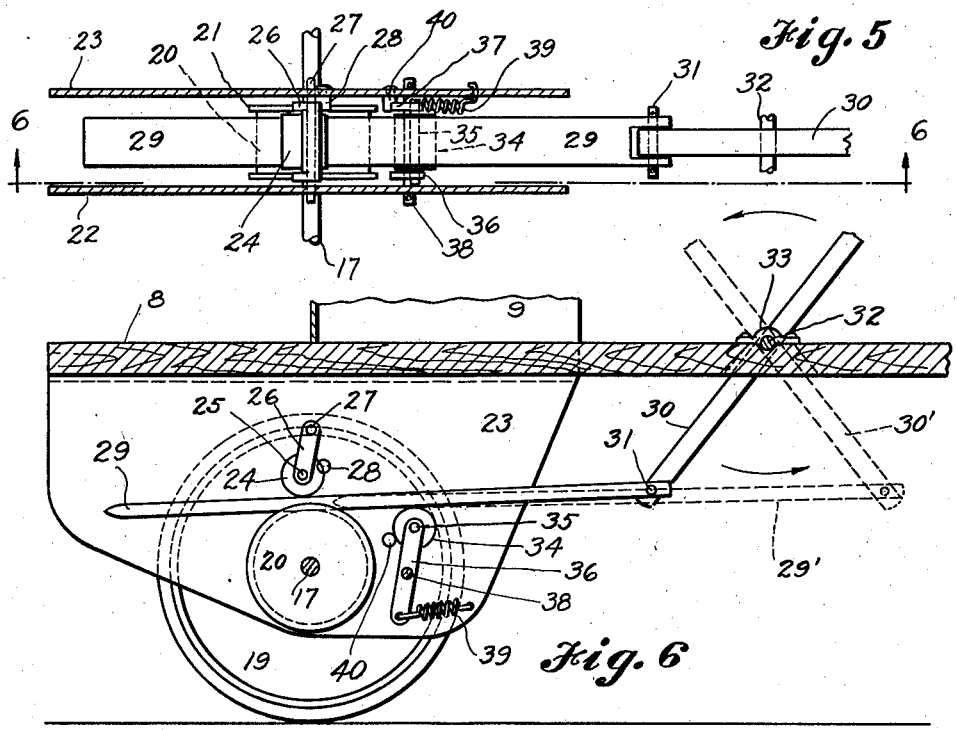
Fig. 5
Fig. 6
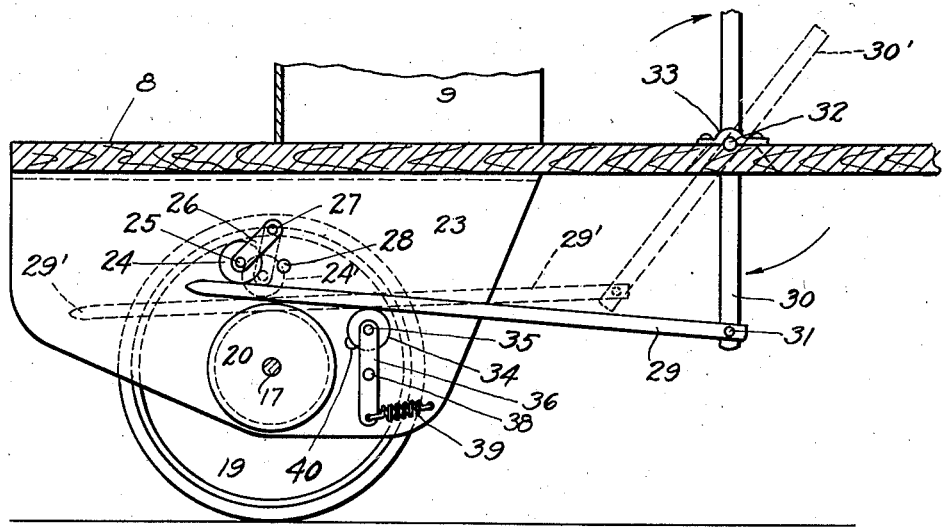
Fig. 7
INVENTOR
D. Henderson
BY
ATTORNEY Patented May 17, 1938

2,117,886

UNITED STATES PATENT OFFICE 2,117,886

MECHANICAL MOVEMENT FOR MOTOR COASTERS

Donald Henderson, Bremerton, Wash.

Application October 6, 1936, Serial No. 104,197

2 Claims. (Cl. 74—128)

This invention relates to friction motor coasters and exercisers, and particularly to coaster vehicles, for children.

In the operation of coaster vehicles, it has been usual to provide cranks, levers and pedals for the creation and application of driving power by the riders. Such constructions have been so arranged that the cranks, pedals and levers were constantly in movement, and continued to gyrate or move backward and forward when the vehicle was running or moving by its own velocity, and when coasting down grades etc., after the operator had ceased to exert driving energy. Such parts so moving when unnecessary have been a source of much inconvenience and some danger to the riders.

It is therefore an object of this invention to provide a coaster with a hand lever and a reciprocating friction bar to operate the same when desired. The said bar and lever not to move except when so desired by the driver, and whereby said friction bar will become automatically disconnected from the driving wheels of the vehicle, when the driving lever is released by the operator.

A further object is to provide a coaster with a single front wheel for supporting the forward portion of the vehicle and for guiding the same, to be operated by the feet of the driver. And to provide two rear wheels connected on an axle for propelling the vehicle, and a friction drum mounted between said two wheels whereon said friction bar may be operated in a forward direction for rotating the drum and operated in a backward direction freed from contact with such drum.

A still further object is to provide a loose pulley suspended in spaced relation over said drum for binding said bar against said drum during the forward motion of said bar; together with a second loose pulley supported in front of said drum, for raising said bar and freeing the same from said drum automatically during the backward travel of said bar, and also to maintain said bar separated from said drum while said vehicle may be coasting, and when the lever is not in use by the driver. An additional object is to provide brakes.

With these and other objects that will hereinafter appear, I have illustratively exemplified my invention by the accompanying drawings, of which:

Figure 5 is a section view taken on lines 5—5 of Figure 2 with the floor frame and side brackets removed, Figure 6 shows a section view taken on lines 6—6 of Figure 5, with the power lever and friction bar in position for beginning a forward stroke of the bar in full lines, and with dotted lines to indicate the positions of said parts at the end of such forward stroke.

Figure 1:
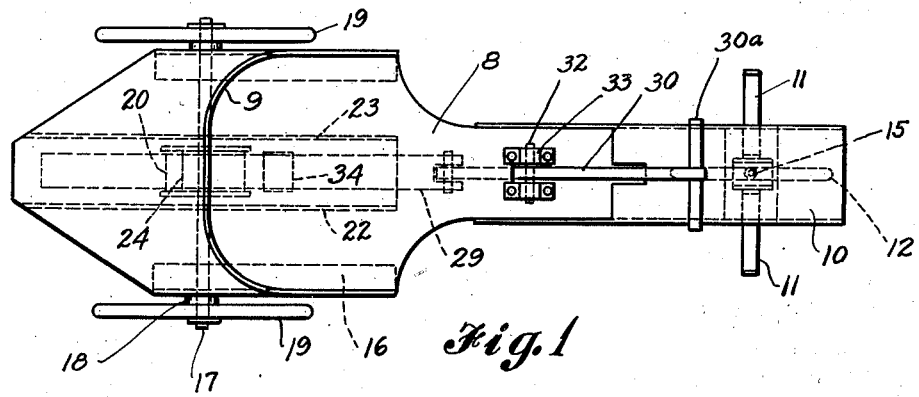
Figure 1 is a plan view.
Figure 2:
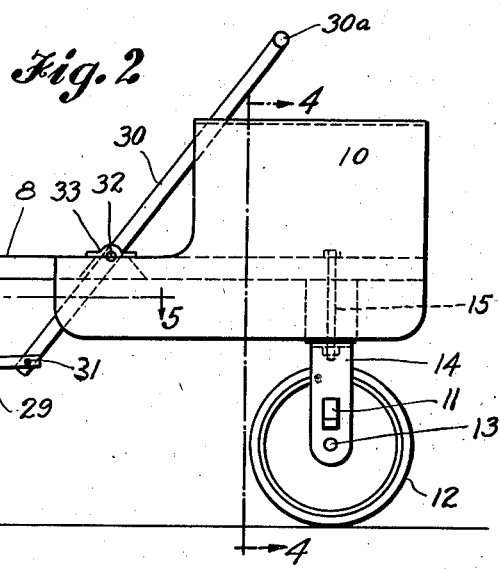
Figure 2 is a side elevation.
Figure 3:
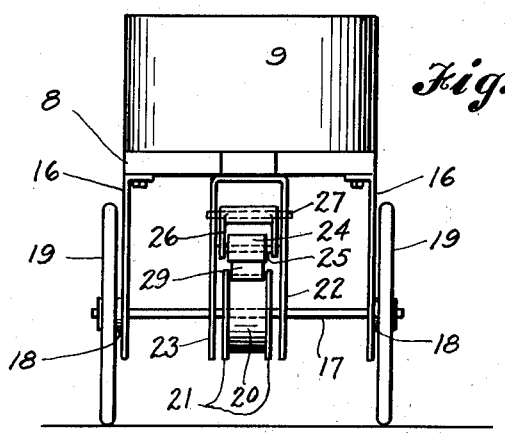
Figure 3 is a rear elevation.
Figure 4:
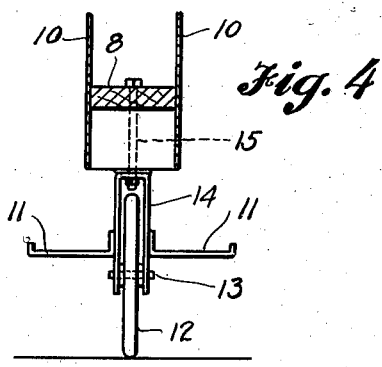
Figure 4 is a section view taken on lines 4—4 of Figure 2.

Figure 7 shows a section view similar to Figure 6, but with different positions. The full lines indicating the power lever and bar in mid position on return backward stroke, as the bar is elevated above the drum by the front pulley. Dotted lines indicate the position of the bar at the end of the backward stroke, with the suspended pulley in forward position binding the bar against the drum.

Like numerals on the different figures represent like parts.

Numeral 8 represents the floor or frame of the vehicle. 9 shows the back of a seat for the driver, on the rear portion of the frame. 10 represents an imitation hood on the front portion of the frame. 11—11 represent foot rests for the feet of the driver, on each side of the central front supporting wheel 12, by which the vehicle is steered. This wheel is freely mounted on a front axle 13, between bifurcated arms 14 which are pivotally connected by king bolt 15 to the frame.

The rear portion of the frame is mounted on side brackets 16, 16, which latter are supported by the driving axle 17 on ordinary roller bearings, indicated as 18, not necessary to be shown in detail. Two rear wheels 19 are affixed to the opposite ends respectively of the axle, for supporting and propelling the coaster. A friction drum 20 is rigidly affixed to the axle midway between the wheels, and is provided with guide flanges 21 on each side of the periphery thereof.

Astride the drum are housing walls 22 and 23, which are attached to the frame above, and extend down freely over the axle. Suspended over the drum in spaced relation therefrom, is a loose pulley or roller 24, rotatively mounted on a cross pin 25. The ends of the pin are attached to arms of a yoke 26, which latter is pivotally suspended on a rod 27 extended through the top of the yoke and through the walls of the housing. The roller is thus free to be swung backward with the yoke, and also forward to a point over the axis of the drum, when the yoke is stopped by a pin 28 projected inward from the housing 23.

In order to rotate the rear wheels a friction bar 29 is provided to be reciprocated over the drum 20 between the guide flanges 21 and beneath the roller 24. This bar is operated by a hand lever 30 and handle 30a. The lower end of the lever is connected with the front end of the bar by pivot pin 31, and is attached midway through the frame above by a fulcrum pin 32 in journals 33. When the top of the lever is moved forward, the bar will be moved backward between the guide flanges and above the drum, and the free roller 24 will be carried backward and upward to permit the bar to rise free from the drum. On the return or forward stroke of the bar, the roller 24 swings forward and downward by gravity until the yoke strikes the stop pin 28, and it then binds or causes the bar to impinge against the drum and cause the same to rotate and turn the driving wheels to move the vehicle forward. The space between the drum and the roller 24 is slightly less than the thickness of the bar, thus assuring a continued friction pressure of the bar against the drum on its forward motion to prevent any slipping of the bar thereover. The stop pin prevents the roller from moving so far forward that it would bind the bar sufficiently to lock or prevent the movement of the bar. The pin also maintains the roller 24 in position suitable for entry of the bar beneath the same from the front side thereof at all times.

In order to prevent any retarding friction or contact between the bar and drum during the backward stroke of the bar, a second loose pulley or supporting roller 34, is adjustably mounted in front of the drum. This roller is rotatably mounted on a pin 35 which is connected between the upper ends of spaced links 36 and 37. The links are mounted on a central pivot pin 38, which permits the roller to be swung backward and upward, and forward and downward. A spring 39 connected between the lower ends of the links and the wall 23 tends to maintain the roller in its highest point of travel, but also permits the roller to be carried forward and downward. A stop pin 40, projected from the wall 23 prevents the links and roller from being carried backward and lowered from said highest point. The bar normally rides over this front pulley, and on its backward travel is lifted above the drum thereby.

It will be understood that the action of the parts is substantially as follows: When the bar is drawn fully forward, the point thereof is freed entirely from the drum as indicated by the dotted lines in Figure 6, and the bar is then supported by the front roller. As the bar is moved backward by the lever, the rear end of the bar rises above the drum as indicated in full lines in Figure 7, but at the end of the back stroke the rear end of the bar is lowered and contacts with the drum as indicated in dotted lines in Figure 7, and so continues in forward travel as indicated in full lines in Figure 6, the front roller moving downward.

By moving the operating lever forward and backward the bar is reciprocated over the drum, and the arrangement of the parts as described will enable the operator to give a forward driving movement to the vehicle wheels during the power stroke, and will allow the vehicle to coast along freely on its own momentum during the return stroke while the bar is free from the drum. In event the operator releases the lever, the bar is automatically carried forward by the moving drum until the tip of the bar is freed from the rear roller, and drum, whereupon the bar and lever will cease to move. This arrangement also enables the operator to hold the lever motionless while coasting, as down a slope. It is not necessary for the operator to move the bar backward to its extreme end of travel, as the return or forward stroke may be commenced at any time by pulling back on the hand lever. The power, or forward stroke, however must be fully completed to enable the tip of the bar to pass forward clear from the drum and rear roller, and so permit the spring and front roller to raise the tip of the bar free from the drum, for a backward stroke.

While I have referred to the use of the vehicle by children, it may be as well used by adults, and may be constructed in any desired size. In practice the vehicle may be found useful not only for pleasure, but is specially beneficial for healthy exercise for development of the chest organs, in operating the driving lever.

By specifically describing the parts, and functions, I do not limit my invention thereto, but desire to cover such equivalents as may be found practicable in use and construction. In some instances where unusual power is to be applied to the lever, it may be advisable to provide the bearing faces of the drum, rear roller and bar with roughened areas or teeth, or rubber, to prevent any danger of slipping.

It will be understood, that the operator may slow-down or stop the vehicle, during the forward travel of the bar between the drum and suspended rear roller, by simply restraining the backward movement of the lever, and thereby the bar will be held in frictional and braking contact with the moving drum, and stop the revolutions thereof.

Having described my invention I claim as new:

1. A mechanical power drive for use in coaster vehicles of the type including a platform, and driving ground wheels mounted on an axle, said drive comprising a friction drum secured on the axle of the vehicle, a friction bar mounted for selective reciprocation, a swinging roller mounted above the friction drum and movable in movement of the friction bar in one direction to permit the bar to move free of the friction drum, said roller cooperating with the bar in movement of the latter in the opposite direction to force the bar in frictional engagement with the drum, and a swinging roller in advance of the drum to fulcrum the bar in the movement of the bar in one direction to prevent contact between the bar and drum.

2. A construction as defined in claim 1, including an operating handle connected to the platform and having a depending end connected to the bar, the length of the handle between the platform and bar compelling a tilting of the bar on the advanced swinging roller to avoid frictional engagement between the bar and drum.

DONALD HENDERSON.